Patented Aug. 4, 1931

1,817,496

UNITED STATES PATENT OFFICE

ARLIE W. SCHORGER, OF MADISON, WISCONSIN, ASSIGNOR, BY MESNE ASSIGNMENTS, TO BURGESS BATTERY CO., OF MADISON, WISCONSIN, A CORPORATION OF WISCONSIN

SEALING COMPOUND

No Drawing.  Application filed January 4, 1928.  Serial No. 244,556.

This invention relates to a fusible sealing compound especially suited to dry battery use and which is characterized by a high resistance to shattering.

It is an object of my invention to toughen the ordinary pitches and sealing waxes used in dry batteries, especially the large "B" batteries, so that these batteries may be subjected to rough handling during transportation without cracking or shattering the seals.

The sealing compounds used in dry battery manufacture vary with the type of service. Some of the compounds have coal-tar or asphalt as the base and are black in color. These compounds may have a filler added to increase their hardness and raise the softening point. Various oils, waxes, rosin or gums may be added. These coal tar or asphalt compounds are not used where the sealing compound must have a red or other bright color. Such compounds are usually made from rosin to which a filler and a coloring material is added and are usually known as sealing wax.

The dry battery sealing compounds, especially those used for the finished seal, must conform to carefully drawn specifications. In general the sealing compounds must be rigid and inflexible at atmospheric temperatures and should not flow at extreme summer temperatures. These specifications generally require that the melting point should be above at least 80° C. and preferably from 88° to 95° C. as determined by the ring and ball method of the American Society for Testing Materials. The compound when molten should flow readily and knit to the paper boxes and zinc cans used in dry battery manufacture. A sealing wax made by adding 58 parts of a finely ground filler such as silica, slate or the like, to 42 parts of rosin gives excellent results. A pigment may replace a portion of the filler. Although the wax made from these proportions is hard and inflexible, it shatters readily when hit a sudden blow or if it is dropped onto a hard object. This property is undesirable especially when the wax is used for sealing the tops of large "B" batteries.

I have discovered that the resistance to shattering of a fusible, inflexible, sealing compound may be increased several fold by incorporating a small amount of mica into the wax. The flaky nature of the mica is probably the property which causes the increased resistance to shattering. The mica may be used in addition to the filler already present but it preferably replaces a portion of it. I prefer using a finely divided or ground mica such as is known to the trade as No. 100 grade. A screen analysis of this grade mica shows that approximately 65 percent passes through a 100 mesh screen and practically all passes through a 50 mesh screen. A coarser mica increases the viscosity of the fused sealing compound. The mica preferably constitutes not more than five percent of the compound, preferably more than one percent and usually about three percent. More than five percent appreciably decreases the fluidity and increases the cost. It is desirable that the amount of mica should be kept at a minimum as its cost is several times that of the filler it replaces.

For instance, I may employ the following ingredients in the preparation of a sealing compound of this character: rosin 42 parts, filler 55 parts, mica 3 parts.

Throughout the specification and claims mica is used in its generic sense and covers the wide range of plate-like silicate minerals similar to the ordinary mica of commerce.

I claim:

1. A sealing compound comprising rosin and a filler and having a melting point of at least 80° C., and containing less than five percent of ground mica.

2. A sealing compound comprising about 42 percent rosin and 58 percent filler containing a small proportion of ground mica, said compound being characterized by a high resistance to shattering.

3. A sealing compound comprising about 42 percent rosin and 58 percent filler containing from one to five percent of No. 100 grade mica.

4. A sealing compound comprising about 42 percent rosin and 58 percent filler containing three percent of No. 100 grade mica.

In testimony whereof I affix my signature.

ARLIE W. SCHORGER.